(12) United States Patent
Gowda et al.

(10) Patent No.: US 11,800,190 B2
(45) Date of Patent: Oct. 24, 2023

(54) METHOD AND SYSTEM FOR CONTENT SWITCHING AND CONTENT CONTROL BASED ON FACIAL IDENTIFICATION PROFILING

(71) Applicant: ARRIS Enterprises LLC, Suwanee, GA (US)

(72) Inventors: Sunil Kumar Puttaswamy Gowda, Bangalore (IN); Vivek Kumar, Bangalore (IN); Dharmendra Kr Shaw, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 17/409,910

(22) Filed: Aug. 24, 2021

(65) Prior Publication Data

US 2022/0070536 A1     Mar. 3, 2022

Related U.S. Application Data

(60) Provisional application No. 63/074,152, filed on Sep. 3, 2020.

(51) Int. Cl.
*H04N 21/466*     (2011.01)
*H04N 21/442*     (2011.01)
(Continued)

(52) U.S. Cl.
CPC ......... *H04N 21/4661* (2013.01); *G06N 20/00* (2019.01); *G06V 40/161* (2022.01);
(Continued)

(58) Field of Classification Search
None
See application file for complete search history.

(56) References Cited

U.S. PATENT DOCUMENTS

2009/0138805 A1*   5/2009   Hildreth ............. H04N 21/4751
                                                                          715/745
2014/0215504 A1   7/2014   Hsiao et al.
(Continued)

FOREIGN PATENT DOCUMENTS

KR         10-1963200 B1     3/2019
KR    10-2019-0066402 A     6/2019

OTHER PUBLICATIONS

Notification of Transmittal of the International Search Report (Forms PCT/ISA/220 and PCT/ISA/210) and the Written Opinion of the International Searching Authority (Form PCT/ISA/237) dated Dec. 3, 2021, by the International Application Division Korean Intellectual Property Office in corresponding International Application No. PCT/US2021/047264. (9 pages).

*Primary Examiner* — Jefferey F Harold
*Assistant Examiner* — Charles N Hicks
(74) *Attorney, Agent, or Firm* — Panitch Schwarze Belisario & Nadel LLC

(57) ABSTRACT

A method, a set-top box, and a non-transitory computer readable medium for content switching and content control based on multi-user profiles. The method includes: capturing, by the set-top box, the facial information of two or more users of the plurality of users viewing content on a media play device, the media play device configured to display content from the set-top box; sending, by the set-top box, the captured facial information of the two or more users of the plurality of user viewing content on the media play device to the server; and receiving, on the set-top box, recommended content for the two or more users viewing the media play device based on a multi-user profile for the two or more users from the plurality of user profiles.

22 Claims, 4 Drawing Sheets

(51) Int. Cl.
*G06N 20/00* (2019.01)
*H04N 21/45* (2011.01)
*H04N 21/454* (2011.01)
*G06V 40/16* (2022.01)

(52) U.S. Cl.
CPC . *H04N 21/44218* (2013.01); *H04N 21/44222* (2013.01); *H04N 21/4532* (2013.01); *H04N 21/4542* (2013.01); *H04N 21/4662* (2013.01); *H04N 21/4667* (2013.01)

(56) References Cited

U.S. PATENT DOCUMENTS

| | | | |
|---|---|---|---|
| 2015/0082330 A1* | 3/2015 | Yun | H04N 21/23418 |
| | | | 725/18 |
| 2015/0271571 A1* | 9/2015 | Laksono | H04N 21/44222 |
| | | | 725/14 |
| 2016/0337696 A1 | 11/2016 | Lee et al. | |
| 2018/0262582 A1* | 9/2018 | Benedetto | H04L 67/52 |
| 2020/0178027 A1 | 6/2020 | Keller | |

\* cited by examiner

_METHOD AND SYSTEM FOR CONTENT SWITCHING AND CONTENT CONTROL BASED ON FACIAL IDENTIFICATION PROFILING_

TECHNICAL FIELD

The present disclosure generally relates to a method and system for content switching and content control based on facial identification and/or facial recognition.

BACKGROUND

Cable service providers, which are also referred to as Multiple System Operators ("MSO"), or any communication or content distribution business that operates through a cable network, renders its services to its subscribers. The services can include, but are not limited to, different subscription plans for broadband Internet access and telephony. In order to consume these services, subscribers connect to a private network owned (or co-owned or rented) by the broadband cable operator which is implemented according to the Data Over Cable Service Interface Specification (DOCSIS) standard.

To provide television and data services, a MSO typically uses a Cable Modem Termination System ("CMTS") for the data services and a quadrature amplitude modulation ("QAM") multiplexer for downstream broadcast television, narrow cast and video-on-demand (VoD) traffic signals. These devices may be located at one or more hubs, which are typically connected to a head end via a network according to a networking protocol, such as Ethernet or SONET. A residential cable customer is typically connected to the CMTS and hub via a cable modem and a wireless router that may be combined in a single box which is called a gateway. In order to view video content that is transmitted through the cable modem or gateway, residential customers connect their televisions to a set-top box (STB). Since set-top boxes have recently gained additional features and functionality, they are often referred to as a smart media device ("SMD") and can be considered as the network interface controller for their peripheral devices.

The set-top box can be used by the subscriber to access a variety of multimedia services, including but not limited to live or linear television, digital video recorder (DVR) content, video-on-demand (VoD) content, over-the-top (OTT) content, and others. For example, set-top boxes usually play user selected content, for example, either live or with a digital video recorder (DVR).

It would be desirable to be able to provide content based on facial identification or facial recognition of two or more users watching the media play device, and wherein the content can include both a variety of multimedia services and advertising, which can be, for example, age appropriate content.

SUMMARY

In accordance with exemplary embodiments, a method and system are disclosed that creates multi-user profiles based on facial information captured by customer-premise equipment or customer-provided equipment (CPE) broadband devices, for example, a set-top box, that can recommend content for the two or more users based on machine learning.

In accordance with an aspect, a method is disclosed for content switching and content control based on multi-user profiles, the method comprising: capturing, by a set-top box, facial information of a plurality of users; forwarding, by the set-top box, the captured facial information of the plurality of users to a server, the server configured to receive the captured facial information of the plurality of users and identify each of the plurality of users based on the facial information captured by the set-top box and creating a plurality of multi-user profiles for each combination of the plurality of users; capturing, by the set-top box, the facial information of two or more users of the plurality of users viewing content on a media play device, the media play device configured to display content from the set-top box; sending, by the set-top box, the captured facial information of the two or more users of the plurality of user viewing content on the media play device to the server; and receiving, on the set-top box, recommended content for the two or more users viewing the media play device based on a multi-user profile for the two or more users from the plurality of user profiles.

In accordance with another aspect, a customer-premises equipment device is disclosed comprising: a camera configured to capture facial information of a plurality of users viewing content on a media play device, the media play device configured to display content from the customer-premises equipment device; and a processor configured to: forward the captured facial information of the plurality of users to a server, the server configured to receive the captured facial information of the plurality of users and identify each of the plurality of users based on the facial information captured by the set-top box and creating a plurality of multi-user profiles for each combination of the plurality of users; send the captured facial information of the two or more users of the plurality of user viewing content on the media play device to the server; and receive recommended content for the two or more users viewing the media play device based on a multi-user profile for the two or more users from the plurality of user profiles.

In accordance with an aspect, a non-transitory computer readable medium having instructions operable to cause one or more processors to perform operations comprising: capturing, by a set-top box, facial information of a plurality of users; forwarding, by the set-top box, the captured facial information of the plurality of users to a server, the server configured to receive the captured facial information of the plurality of users and identify each of the plurality of users based on the facial information captured by the set-top box and creating a plurality of multi-user profiles for each combination of the plurality of users; capturing, by the set-top box, the facial information of two or more users of the plurality of users viewing content on a media play device, the media play device configured to display content from the set-top box; sending, by the set-top box, the captured facial information of the two or more users of the plurality of user viewing content on the media play device to the server; and receiving, on the set-top box, recommended content for the two or more users viewing the media play device based on a multi-user profile for the two or more users from the plurality of user profiles.

BRIEF DESCRIPTION OF THE DRAWINGS

FIGS. 3A-3D illustrate a plurality of combinations of two or more users in accordance with an embodiment.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

Figure 1:
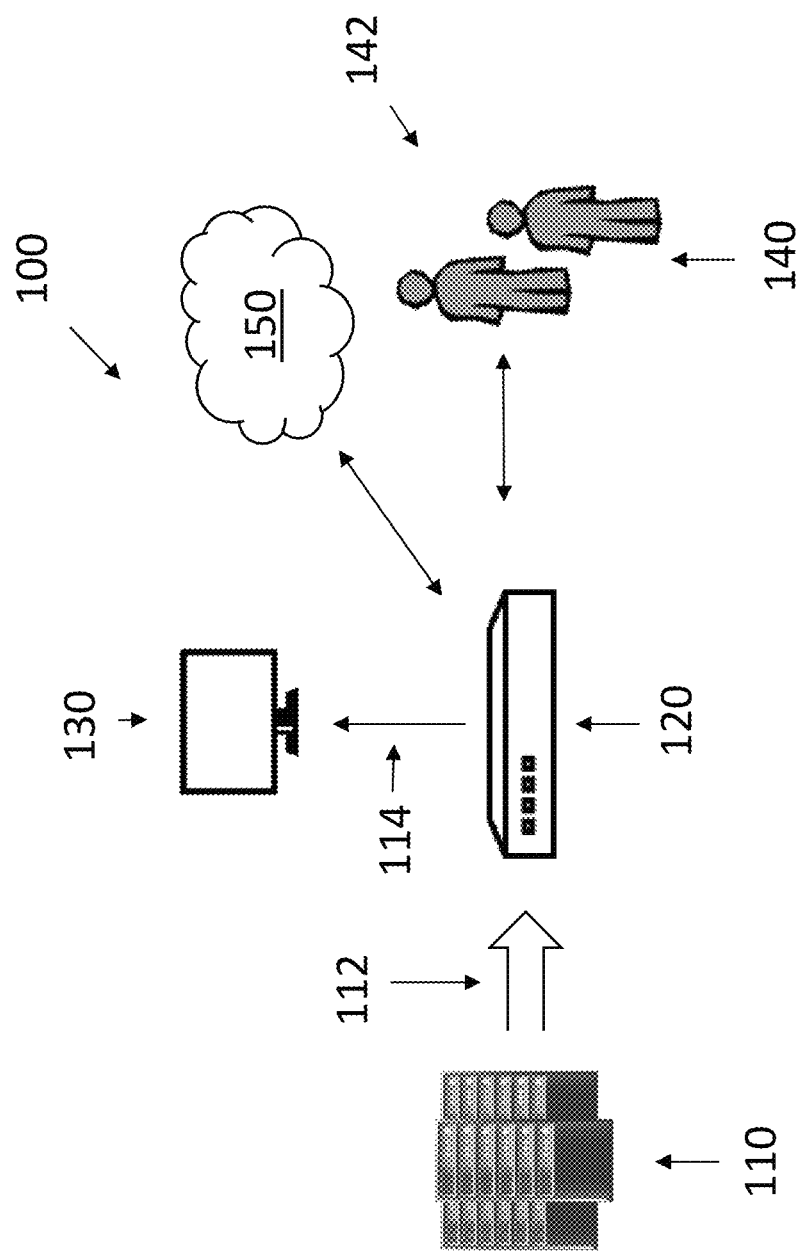
FIG. 1 is an illustration of an exemplary network environment for a method and system for content switching and content control using facial identification.

System for Content Switching and Content Control Based on Facial Identification Profiling FIG. 1 is a block diagram illustrating an example network environment 100 to content switching and content control based on facial identification and facial recognition. In embodiments, a cable provider (or MSO) server 110 can provide, for example, media content, for example, video and/or data services to a set-top box 120, for example, a customer premise equipment (CPE) device. The set-top box 120 may communicate with one or more media play devices 130 over a local network 114 (for example, a local area network (LAN), a wireless local area network (WLAN), a personal area network (PAN), etc.) and/or wired, for example, a television. The set-top box 120 may communicate with an upstream wide area network (WAN) 112 to the cable provider server 110. In accordance with an embodiment, the cable provider server 110 can provide high-bandwidth data transfer, for example, media content, cable television and broadband internet access.

In accordance with an exemplary embodiment, the media device 130 may be any type of computing device configured to connect via a wireless network, for example, wireless network utilizing an IEEE 802.11 specification, including a smart phone, a smart TV, a computer, a mobile device, a tablet, or any other device operable to communicate wirelessly with the set-top box 120. In accordance with an alternative embodiment, the media device 130 can be a television, for example, that is directly connected to the set-top box 120.

In accordance with an exemplary embodiment, the set-top box 120 may communicate with the cable provider server 110 over a wired or a wireless connection. A wireless connection between the cable provider server 110 and the set-top box 120 may be established through a protected setup sequence (for example, Wi-Fi protected setup (WPS)). The protected setup sequence may include the steps of scanning multiple wireless channels for an available access point, exchanging one or more messages between a station and access point, exchanging key messages (for example, pre-shared key (PSK)) between the station and access point, and installing a key (for example, PSK) at the station.

As set forth, the set-top box 120, for example, customer premise equipment (CPE) device, typically provides access to a variety of multimedia services, including but not limited to live or linear television, digital video recorder (DVR) content, video-on-demand (VoD) content, over-the-top (OTT) content, and others. Alternatively, the set-top box 120 (e.g., customer premise equipment) can receive Internet Protocol-based (IP-based) streaming content from through the upstream wide area network (WAN) 112 and cable provider server 110. In embodiments, various data, multimedia, and/or voice services may be delivered to the set-top box 120 including but not limited to, live or broadcast television, video-on-demand (VoD) content, pay-per view content, recorded content (e.g., DVR content), audio-only content, streaming content, and others. The set-top box 120 may process and output content to one or more media play device 130 such as a television, mobile device, tablet, computer, and any other device operable to receive video, voice, and/or data services.

In accordance with an embodiment, the set-top box 120 can include a camera or sensor 240 (FIG. 2) configured to recognize each of the one or more users 140 to create one or more profiles for each group of the one more users 140 as disclosed herein. Each of the one of the one or more profiles of users 140 can be used to deliver content and/or advertisement, and can also be used to implement, for example, parental controls to help ensure that the users 140 are watching and/or listening to age appropriate content. In addition, using a machine learning or artificial intelligence applications, the method and system for content switching and content control can build a mathematical model for each of the users 140, for example, based on previously viewed content (i.e., training data) in order to deliver content and/or advertisements to the each of the groups 142 of users 140 based on the profiles developed.

In accordance with an embodiment, the system 100 can also include a server 150, for example, a cloud server that can be configured to receive a list of each of the users 140 and corresponding content that is being watched or viewed by the users 140 to providing the training data to the machine learning application or program. In accordance with an embodiment, if the users 140 are part of an existing group 142 of users 140 having a multi-user profile that has been created in the server 150, the server 150 can recommend content for the group 142 of users 140. Alternatively, if the group 142 of users 140 do not have a multi-user profile that has been created within the server 150, a new multi-user profile can be created based on the facial recognition and/or facial identification of the users 140. In addition, for both existing multi-user profiles and new multi-user profiles, the corresponding multi-user profile can be updated within the server 150 as disclosed herein.

Computer System Architecture

Figure 2:
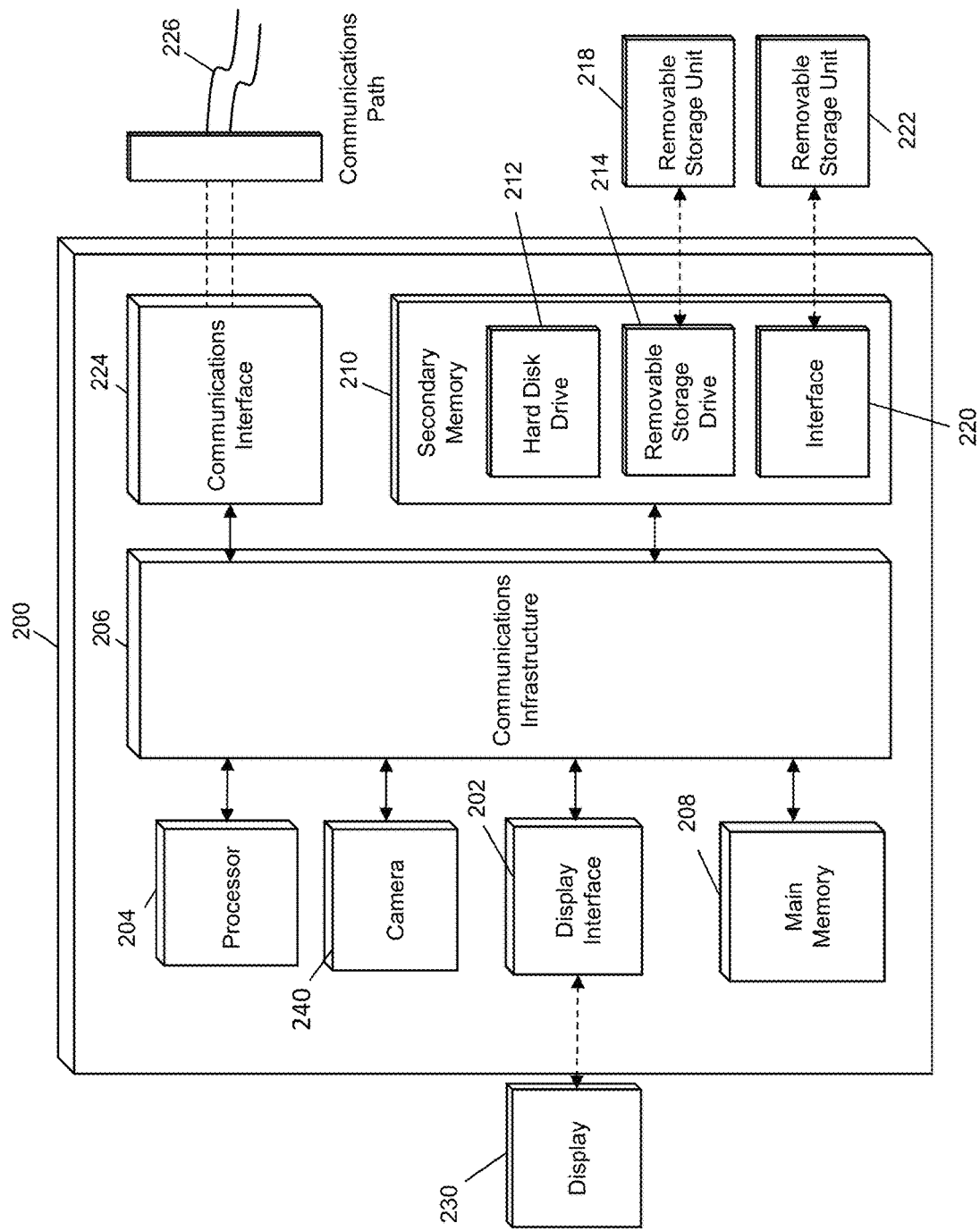
FIG. 2 is an exemplary hardware architecture for an embodiment of a communication device.

FIG. 2 illustrates a representative computer system 200 in which embodiments of the present disclosure, or portions thereof, may be implemented as computer-readable code executed on hardware. For example, the cable provider server 110, the set-top box 120, the media play device 130, and the server (e.g., cloud server) 150 of FIGS. 1, 3A-3D, and 4 may be implemented in whole or in part by a computer system 200 using hardware, software executed on hardware, firmware, non-transitory computer readable media having instructions stored thereon, or a combination thereof and may be implemented in one or more computer systems or other processing systems. Hardware, software executed on hardware, or any combination thereof may embody modules and components used to implement the methods and steps of the presently described method and system.

If programmable logic is used, such logic may execute on a commercially available processing platform configured by executable software code to become a specific purpose computer or a special purpose device (for example, programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 218, a removable storage unit 222, and a hard disk installed in hard disk drive 212.

Various embodiments of the present disclosure are described in terms of this representative computer system 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

A processor device 204 may be processor device specifically configured to perform the functions discussed herein. The processor device 204 may be connected to a communications infrastructure 206, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 200 may also include a main memory 208 (e.g., random access memory, read-only memory, etc.), and may also include a secondary memory 210. The secondary memory 210 may include the hard disk drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. For example, if the removable storage drive 214 is a floppy disk drive or universal serial bus port, the removable storage unit 218 may be a floppy disk or portable flash drive, respectively. In one embodiment, the removable storage unit 218 may be non-transitory computer readable recording media.

In some embodiments, the secondary memory 210 may include alternative means for allowing computer programs or other instructions to be loaded into the computer system 200, for example, the removable storage unit 222 and an interface 220. Examples of such means may include a program cartridge and cartridge interface (e.g., as found in video game systems), a removable memory chip (e.g., EEPROM, PROM, etc.) and associated socket, and other removable storage units 222 and interfaces 220 as will be apparent to persons having skill in the relevant art.

Data stored in the computer system 200 (e.g., in the main memory 208 and/or the secondary memory 210) may be stored on any type of suitable computer readable media, such as optical storage (e.g., a compact disc, digital versatile disc, Blu-ray disc, etc.) or magnetic storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 200 may also include a communications interface 224. The communications interface 224 may be configured to allow software and data to be transferred between the computer system 200 and external devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

The computer system 200 may further include a display interface 202. The display interface 202 may be configured to allow data to be transferred between the computer system 200 and external display 230. Exemplary display interfaces 202 may include high-definition multimedia interface (HDMI), digital visual interface (DVI), video graphics array (VGA), etc. The display 230 may be any suitable type of display for displaying data transmitted via the display interface 202 of the computer system 200, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 208 and secondary memory 210, which may be memory semiconductors (e.g., DRAMs, etc.). These computer program products may be means for providing software to the computer system 200. Computer programs (e.g., computer control logic) may be stored in the main memory 308 and/or the secondary memory 210. Computer programs may also be received via the communications interface 224. Such computer programs, when executed, may enable computer system 200 to implement the present methods as discussed herein. In particular, the computer programs, when executed, may enable processor device 204 to implement the methods illustrated by FIGS. 1, 3, and 4 as discussed herein. Accordingly, such computer programs may represent controllers of the computer system 200. Where the present disclosure is implemented using software executed on hardware, the software may be stored in a computer program product and loaded into the computer system 200 using the removable storage drive 214, interface 220, and hard disk drive 212, or communications interface 224.

The processor device 204 may comprise one or more modules or engines configured to perform the functions of the computer system 200. Each of the modules or engines may be implemented using hardware and, in some instances, may also utilize software executed on hardware, such as corresponding to program code and/or programs stored in the main memory 208 or secondary memory 210. In such instances, program code may be compiled by the processor device 204 (e.g., by a compiling module or engine) prior to execution by the hardware of the computer system 200. For example, the program code may be source code written in a programming language that is translated into a lower level language, such as assembly language or machine code, for execution by the processor device 204 and/or any additional hardware components of the computer system 200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 200 to perform the functions disclosed herein. It will be apparent to persons having skill in the relevant art that such processes result in the computer system 200 being a specially configured computer system 200 uniquely programmed to perform the functions discussed above.

In accordance with an exemplary embodiment, for example, when the computer system 200 is a set-top box 120, the set-top box 120 can include a camera 240, which can be contained within the set-top box 120, or an external camera 240 in communication with the set-top box 120. In accordance with an embodiment, the camera 240 can be a sensor, for example, a RGB/infrared sensor or other facial recognition system that is capable of obtaining an image, for example, a digital image or video frame from a video source that can be used to identify a user 140 by comparing, for example, selected facial features from given images with faces of users 140 within a database. Alternatively, the facial recognition system can be a biometric artificial intelligence based application that can uniquely identify a user by analyzing patterns based on a user's facial textures and shape, for instance.

FIGS. 3A-3D illustrate a plurality of combinations 300 of two or more users in accordance with an embodiment. As shown in FIGS. 3A-3D, each of the plurality of users can be a part of two or more combinations of users. For example, in FIG. 3A, the combination of two or more users 310 can include one adult and two or more children, for example, each of the two or more children being of an age in which content restrictions (e.g., age appropriate content restrictions) can be applied. In FIG. 3B, the combination of two or more users 320 can include one adult and one child, and wherein the child may be of an age in which age appropriate content restrictions are not necessary. In FIG. 3C, the two or more users 330 can include two adults in which no content restrictions are applicable. In FIG. 3D, the two or more users 340 can include two adult and two children in which age appropriate content restrictions should be applied. In accordance with each of the combinations of users, the various multimedia services can be identified and subject matter, for example, movies, documentaries, comedy, science fictions, sports, children shows, etc. can be identified based on a machine learning algorithm.

Figure 4:
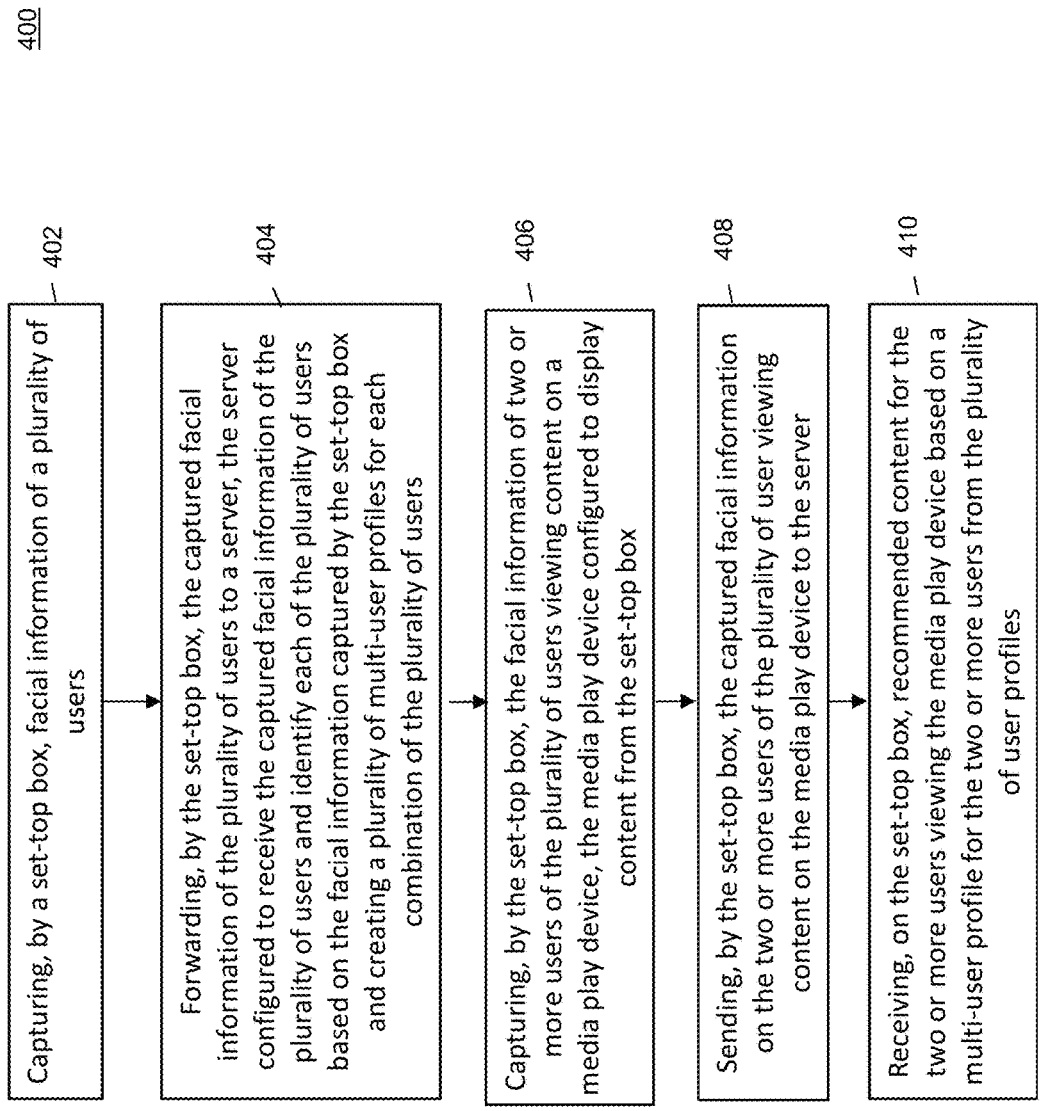
FIG. 4 is a flow chart of a method for content switching and content control based on facial identification profiling in accordance with an embodiment.

Method for Content Switching and Content Control Based on Facial Identification and Facial Recognition Profiling FIG. 4 is a flow chart 400 of a method for content switching and content control based of facial identification profiling in accordance with an embodiment. As shown in FIG. 4, the method for content switching and content control based on multi-user profiles includes in step 402, capturing facial information of a plurality of users by the set-top box. In step 404, forwarding the captured facial information of the plurality of users from the set-top box to a server. The server being configured to receive the captured facial information of the plurality of users and identify each of the plurality of users based on the facial information captured by the set-top box and creating a plurality of multi-user profiles for each combination of the plurality of users. In step 406, the facial information of two or more users of the plurality of users viewing content on a media play device are captured by the set-top box, and wherein the media play device is configured to display content from the set-top box. In step 408, the captured facial information of the two or more users of the plurality of user viewing content on the media play device is sent to the server. In step 410, the set-top box receives recommended content for the two or more users viewing the media play device based on a multi-user profile for the two or more users from the plurality of user profiles.

In accordance with an embodiment, content recommendations can further include age appropriate recommended content for the multi-user profile for the two or more users, which is received on the set-top box. In addition, the recommended content may include advertisement content. The method may also generate the recommended content for the two or more users viewing the media play device with a machine learning algorithm. In accordance with an embodiment, a machine learning algorithm, for example, can update the recommended content while the two or more users are viewing content on the media play device, or alternatively, the machine learning algorithm can be trained to provide recommended content, at preset intervals, for example, daily, weekly, etc.

In accordance with an embodiment, a new multi-user profile can be received on the set-top box for the two or more users when a combination of the captured information on the two or more users has not previously been captured by the set-top box with recommended content for the new multi-user profile. In addition, content currently being watched by the two or more users can be sent by the set-top box to the server, and the set-top box can receive further content recommendations based on the content being currently watched.

In accordance with an aspect, advertisements based on the multi-user profile for the two or more users viewing the media play device can be received on the set-top box, and the advertisements can be sent by the set-top box to the media display device for display on a display.

In accordance with another aspect, access to certain content can be restricted on the set-top box for the two or more users of the plurality of users viewing the content based on the multi-user profile of the two or more users. For example, the restricting of the access to certain content may be based on age of one of the two or more users.

In accordance with an aspect, the plurality users may be three or more, and when the facial information of one of the three or more users has not previously been captured by the set-top box, the method can include receiving, on the set-top box, the recommended content for two or more users having the multi-user profile, and receiving, on the set-top box, a new multi-user profile for the three or more users with recommended content for the new multi-user profile.

In accordance with another embodiment, facial information of a new user different from the two or more users viewing content on the media play device may be captured by the set-top box, for example, a child enters the room while two or more adults are watching content on the media play device. In accordance with an embodiment, the facial information of the new user is forwarded by the set-top box to the server, and the set-top box may receive recommended content based on a new multi-user profile from the new user and the two or more users viewing content on the media play device. In addition, the set-top box may restricted he two or more users from continuing viewing content on the media play device when the new multi-user profile has content restrictions, for example, an age restriction on the new user different from the two or more users.

Techniques consistent with the present disclosure provide, among other features, methods and systems for content switching and content control based on facial identification and facial identification profiling. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for content switching and content control based on multi-user profiles, the method comprising:
   receiving, by a processor, a list of content viewed by a plurality of users, facial information for each of the plurality of users, and one or more content restrictions for one or more of the plurality of users;
   creating, by the processor, a plurality of multi-user profiles, each multi-user profile being a combination of the previously viewed content and the one or more content restrictions associated with at least two of the plurality of users;
   receiving, by the processor, facial information for two of the plurality of users viewing content on a media play device;
   identifying, by the processor, a multi-user profile corresponding to the combination of the two of the plurality of users, the identified multi-user profile containing one or more content restrictions for at least one of the two of the plurality of users viewing content on a media play device;
   generating, by the processor, recommended content for the two of the plurality of users based on the identified multi-user profile corresponding to the combination of the two of the plurality of users, the recommended content complying with the one or more content restrictions; and
   transmitting, by the processor, the recommend content to be displayed on the media play device.

2. The method according to claim 1, wherein the one or more content restrictions is a parental control.

3. The method according to claim 1, wherein no multi-user profile corresponds to the two of the plurality of users viewing content on a media play device;
   creating, by the processor, a new multi-user profile for the combination of the two of the plurality of users viewing content on a media play device; and
   wherein the recommended content is based on the new multi-user profile.

4. The method according to claim 1, further comprising:
   receiving, by the processor, content currently being watched by the two of the plurality of users on the media play device; and
   generating, by the processor, further content recommendations based on the content currently being watched.

5. The method according to claim 1, further comprising:
   generating, by the processor, advertisements for the two of the plurality of users based on the identified multi-user profile corresponding to the combination of the two of the plurality of users; and
   transmitting, by the set-top box, the advertisements to be displayed on the media display device.

6. The method according to claim 1, wherein the one or more content restrictions is based on an age of one of the plurality of users of the multi-user profile.

7. The method according to claim 1, wherein the subset of the plurality users is three or more, and the facial information of one of the three or more users has not previously been received, the method comprising:
   generating, by the processor, recommended content for two or more of the plurality of users having a multi-user profile;
   creating, by the processor, a new multi-user profile for the three or more users; and
   generating, by the processor, recommended content based on the new multi-user profile.

8. The method according to claim 1, further comprising:
   receiving, by the processor, facial information of a new user viewing content on the media play device in addition to the two of the plurality of users viewing content on a media play device;
   identifying, by the processor, a new multi-user profile corresponding to the combination of the two of the plurality of users and the new user, the new multi-user profile including one or more different content restrictions;
   generating, by the processor, recommended content based on the new identified multi-user profile, wherein the recommended content is allowed by the one or more different content restrictions.

9. The method according to claim 1, wherein the generating the recommended content uses a machine learning algorithm.

10. A server comprising:
    a processor configured to:
      receive a list of content viewed by a plurality of users, facial information for each of the plurality of users, and one or more content restrictions for one or more of the plurality of users;
      create a plurality of multi-user profiles, each multi-user profile being a combination of the previously viewed content and the one or more content restrictions associated with at least two of the plurality of users;
      receive facial information for two of the plurality of users viewing content on a media play device;
      identify a multi-user profile corresponding to the combination of the two of the plurality of users, the identified multi-user profile containing one or more content restrictions for at least one of the two of the plurality of users viewing content on a media play device;
generate recommended content for the two of the plurality of users based on the identified multi-user profile corresponding to the combination of the two of the plurality of users, the recommended content complying with the one or more content restrictions; and
transmit the recommend content to be displayed on the media play device.

11. The server according to claim 10, wherein the one or more content restrictions is a parental control.

12. The server according to claim 10, wherein no multi-user profile corresponds to the two of the plurality of users viewing content on a media play device and the processor is further configured to:
create a new multi-user profile for the combination of the two of the plurality of users viewing content on a media play device; and
wherein the recommended content is based on the new multi-user profile.

13. The server according to claim 10, wherein the processor is further configured to:
receive content currently being watched by the two of the plurality of users on the media play device; and
generate further content recommendations based on the content currently being watched.

14. The server according to claim 10, wherein the processor is further configured to:
generate advertisements for the two of the plurality of users based on the identified multi-user profile corresponding to the combination of the two of the plurality of users; and
transmit the advertisements to be displayed on the media display device.

15. The server according to claim 10, wherein the processor is further configured to:
receive facial information of a new user viewing content on the media play device in addition to the two of the plurality of users viewing content on a media play device;
identify a new multi-user profile corresponding to the combination of the two of the plurality of users and the new user, the new multi-user profile including one or more different content restrictions;
generate recommended content based on the new identified multi-user profile, wherein the recommended content is allowed by the one or more different content restrictions.

16. A non-transitory computer readable medium having instructions operable to cause one or more processors to perform operations comprising:
receiving, by a processor, a list of content viewed by a plurality of users, facial information for each of the plurality of users, and one or more content restrictions for one or more of the plurality of users;
creating, by the processor, a plurality of multi-user profiles, each multi-user profile being a combination of the previously viewed content and the one or more content restrictions associated with at least two of the plurality of users;
receiving, by the processor, facial information for two of the plurality of users viewing content on a media play device;
identifying, by the processor, a multi-user profile corresponding to the combination of the two of the plurality of users, the identified multi-user profile containing one or more content restrictions for at least one of the two of the plurality of users viewing content on a media play device;
generating, by the processor, recommended content for the two of the plurality of users based on the identified multi-user profile corresponding to the combination of the two of the plurality of users, the recommended content complying with the one or more content restrictions; and
transmitting, by the processor, the recommend content to be displayed on the media play device.

17. The non-transitory computer readable medium according to claim 16, wherein the one or more content restrictions is a parental control.

18. The non-transitory computer readable medium according to claim 16, wherein no multi-user profile corresponds to the two of the plurality of users viewing content on a media play device;
creating, by the processor, a new multi-user profile for the combination of the two of the plurality of users viewing content on a media play device; and
wherein the recommended content is based on the new multi-user profile.

19. The non-transitory computer readable medium according to claim 16, further comprising:
receiving, by the processor, content currently being watched by the two of the plurality of users on the media play device; and
generating, by the processor, further content recommendations based on the content currently being watched.

20. The non-transitory computer readable medium according to claim 16, further comprising:
generating, by the processor, advertisements for the two of the plurality of users based on the identified multi-user profile corresponding to the combination of the two of the plurality of users; and
transmitting, by the set-top box, the advertisements to be displayed on the media display device.

21. The non-transitory computer readable medium according to claim 16, further comprising:
receiving, by the processor, facial information of a new user viewing content on the media play device in addition to the two of the plurality of users viewing content on a media play device;
identifying, by the processor, a new multi-user profile corresponding to the combination of the two of the plurality of users and the new user, the new multi-user profile including one or more different content restrictions;
generating, by the processor, recommended content based on the new identified multi-user profile, wherein the recommended content is allowed by the one or more different content restrictions.

22. The method according to claim 1, wherein the previously viewed content is one or more of: live television content, broadcast television content, video-on-demand (VOD) content, over-the-top (OTT) content, pay-per view content, recorded content, audio-only content, and streaming content.

* * * * *